M. J. HINDEN.
Rotary Water-Meter.
No. 211,572. Patented Jan. 21, 1879.
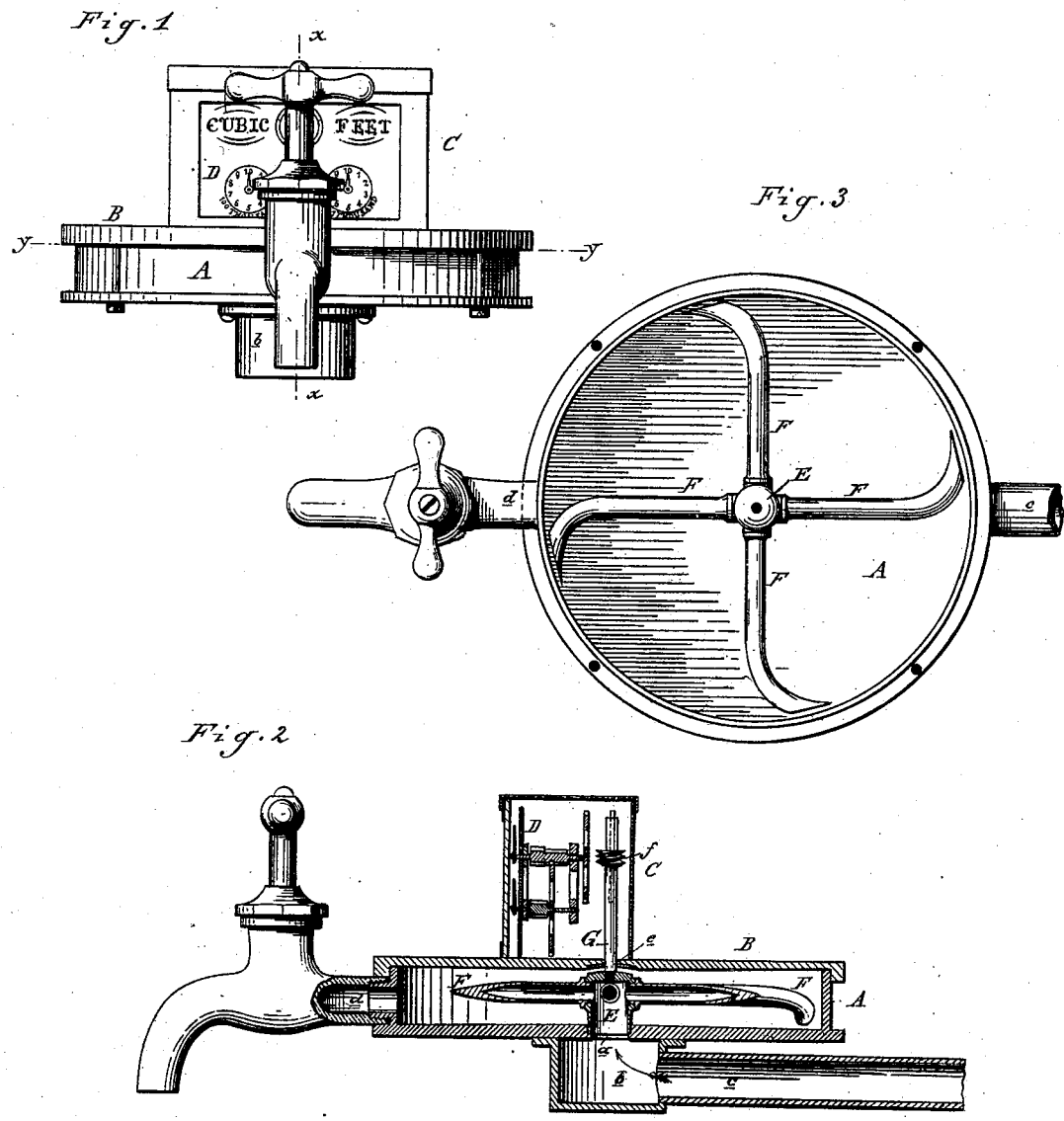

UNITED STATES PATENT OFFICE.

MATHIAS J. HINDEN, OF DETROIT, MICHIGAN, ASSIGNOR OF ONE-HALF HIS RIGHT TO EDWARD W. VOIGT, OF SAME PLACE.

IMPROVEMENT IN ROTARY WATER-METERS.

Specification forming part of Letters Patent No. 211,572, dated January 21, 1879; application filed October 28, 1878.

*To all whom it may concern:*

Be it known that I, MATHIAS JOSEPH HINDEN, of Detroit, in the county of Wayne and State of Michigan, have invented an Improvement in Water-Meters, of which the following is a specification:

The nature of my invention relates to new and useful improvements in the construction of that class of devices wherein the weight of the column and its velocity operate registering devices, which indicate the amount of water discharged.

The invention consists in the peculiar construction and arrangement of parts, and in certain details of construction, as more fully hereinafter described.

In the drawings, Figure 1 is a front elevation. Fig. 2 is a vertical central section on line $x\,x$, Fig. 1. Fig. 3 is a longitudinal section on line $y\,y$, Fig. 1.

In the accompanying drawings, which form a part of this specification, A represents the case, provided with a central opening, $a$, which affords communication with the small chamber $b$, secured to the bottom of the case, and into which the inlet-pipe $c$ admits water from any source of supply under pressure. From the opposite side of the case leads the discharge-pipe $d$.

B is the cap or cover of the case, provided with a central opening, $e$. This cover is surmounted by the box C, which conceals a multiplying-train, such as is ordinarily found in gas-meters, to give motion to the registering devices D.

E is a hollow hub, the diameter of which corresponds with that of the central opening, $a$, within which said hub freely rotates. Four hollow arms, F, radiate from this hub, into which they are inserted in order to have free communication with the interior thereof, and are each curved in the same direction, as shown in Fig. 3, and are so placed that the outer ends thereof turn slightly downward. The upper end of the hub is closed, except a small aperture, into which one end of the spindle G is rigidly secured.

The spindle passes through the central aperture, $e$, in the cap or cover B into the box C, and has secured near its upper end a worm-wheel, $f$, which engages with the teeth of the driving-wheel of the train. The hub and hollow arms connected therewith are made of vulcanized or hard rubber, which is non-corrosive. Any other substance possessing like quality may be used in place of the rubber.

In practice, and when properly attached, the water enters the inlet-pipe, and, passing through the chamber $b$, enters the lower end of the hollow hub, the force of the water raising the hub partially out of its seat in the central opening, $a$, until the top of the hub rests against the under side of the cap. The water passes from the hub through the arms until the chamber in the case is filled. Up to this point the faucet or cock is closed. This cock being now opened to allow the water to be discharged, the arms commence rotating with the hub, communicating motion through the spindle and worm-wheel to the train, which, in turn, moves the registering apparatus, which indicates the amount drawn. As soon as the cock is closed the motion of the arms stops.

It will be noticed that the water-inlet is unobstructed, that the hub will be raised from its bearing and relieved of friction by a slight pressure of water, principally on account of the downward curve given to the outer ends of the hollow arms, and that the whole meter is of very simple construction.

I am aware that a rotary meter has before been made having an inlet-opening through the center of its bottom plate, and having hollow radial arms and a hub which is raised from its bearing by the pressure of the water on its upper closed end; but this meter is not as sensitive as mine, not having downwardly-curved arms, and the water-inlet in the same is partly obstructed, the entire meter being, in addition, more complex and more expensive than my device.

What I claim as my invention is—

The water-meter described, consisting of the flat circular case A, provided with an unobstructed inlet, $a$, through the center of its bottom plate, and an outlet, $d$, in one side, the hollow hub E, having its lower open end resting on a shoulder around the inlet-opening $a$, the hollow curved arms F, with their outer ends turned downwardly, and the spindle G, extending from the closed top of the hub through the case A, and operating a registering apparatus, the said hollow hub being moved vertically between the top and bottom plates of the case by the pressure of the water in such hub and the downward curve of the hollow arms, substantially as set forth and shown.

MATHIAS JOSEPH HINDEN.

Witnesses:
H. S. SPRAGUE,
CHAS. J. HUNT.